(12) United States Patent
Kaita et al.

(10) Patent No.: US 9,676,384 B2
(45) Date of Patent: Jun. 13, 2017

(54) HYBRID VEHICLE AND CONTROL METHOD OF HYBRID VEHICLE

(71) Applicant: TOYOTA JIDOSHA KABUSHIKI KAISHA, Toyota-shi, Aichi-ken (JP)

(72) Inventors: Keiji Kaita, Miyoshi (JP); Takahiko Hirasawa, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/903,408

(22) PCT Filed: May 20, 2014

(86) PCT No.: PCT/JP2014/002648
§ 371 (c)(1),
(2) Date: Jan. 7, 2016

(87) PCT Pub. No.: WO2015/004833
PCT Pub. Date: Jan. 15, 2015

(65) Prior Publication Data
US 2016/0152230 A1    Jun. 2, 2016

(30) Foreign Application Priority Data

Jul. 9, 2013    (JP) .................................. 2013-143506

(51) Int. Cl.
*B60L 9/00*        (2006.01)
*B60L 11/00*       (2006.01)
(Continued)

(52) U.S. Cl.
CPC ............ *B60W 20/50* (2013.01); *B60W 10/06* (2013.01); *B60W 10/08* (2013.01); *B60W 20/00* (2013.01); *B60W 20/10* (2013.01); *G01F 23/00* (2013.01); *B60K 6/445* (2013.01); *B60K 2015/03217* (2013.01); *B60W 2050/0215* (2013.01); *B60W 2510/0623* (2013.01); *B60W 2520/10* (2013.01); *B60W 2560/02* (2013.01); *F02D 33/006* (2013.01); *G01F 25/0061* (2013.01);
(Continued)

(58) Field of Classification Search
CPC ...................................................... B60W 20/50
See application file for complete search history.

(56) References Cited

U.S. PATENT DOCUMENTS

| | | | | |
|---|---|---|---|---|
| 2003/0136173 A1* | 7/2003 | Elenich | .................. | G01F 9/001 73/1.73 |
| 2007/0266762 A1* | 11/2007 | Rumpf | ................. | F02M 37/025 73/1.73 |
| 2014/0288747 A1* | 9/2014 | Saito | ...................... | B60K 6/442 701/22 |

FOREIGN PATENT DOCUMENTS

| | | |
|---|---|---|
| JP | 10-73468 | 3/1998 |
| JP | 2006-214390 | 8/2006 |
| JP | 2008-514905 A | 5/2008 |

\* cited by examiner

*Primary Examiner* — Imran Mustafa
(74) *Attorney, Agent, or Firm* — Finnegan, Henderson, Farabow, Garrett & Dunner, LLP

(57) ABSTRACT

An ECU determines in an HV mode that a fuel sender gauge is in malfunction when a first condition is met, and determines in an EV mode that the fuel sender gauge is in malfunction when a second condition differing from the first condition is met. The first condition is met when the difference between an estimated value of the fuel consumption amount and an amount of change in the detection value by the fuel sender gauge is greater than a predetermined value Z. The second condition is met when the detection value changes exceeding a predetermined range X.

8 Claims, 5 Drawing Sheets

(51) Int. Cl.
*G05D 1/00* (2006.01)
*G05D 3/00* (2006.01)
*G06F 7/00* (2006.01)
*G06F 17/00* (2006.01)
*B60W 20/50* (2016.01)
*B60W 20/00* (2016.01)
*B60W 10/06* (2006.01)
*B60W 10/08* (2006.01)
*B60W 20/10* (2016.01)
*G01F 23/00* (2006.01)
*B60K 15/03* (2006.01)
*B60W 50/02* (2012.01)
*F02D 33/00* (2006.01)
*G01F 25/00* (2006.01)
*B60K 6/445* (2007.10)

(52) U.S. Cl.
CPC ........ *Y02T 10/6239* (2013.01); *Y02T 10/6269* (2013.01); *Y02T 10/6286* (2013.01)

HYBRID VEHICLE AND CONTROL METHOD OF HYBRID VEHICLE

CROSS-REFERENCE TO TELATED APPLICATONS

This application is a national phase application of International Application No. PCT/JP2014/002648, filed May 20, 2014, and claims the priority of Japanese Application No. 2013-143506, filed Jul. 9, 2013, the content of both of which is incorporated herein by reference.

TECHNICAL FIELD

The present invention relates to a hybrid vehicle, and a control method of a hybrid vehicle. Particularly, the present invention relates to the technique of determining a malfunction in a detector for detecting an amount of fuel in a fuel tank.

BACKGROUND ART

Japanese Patent Laying-Open No. 2006-214390 (PTL 1) discloses a failure diagnosis device of a fuel level sensor for detecting the amount of fuel in a fuel tank. This failure diagnosis device determines that the fuel level sensor is in malfunction in the case where the fuel level detected by the fuel level sensor does not change exceeding a determination threshold value when the vehicle has run for a predetermined running distance. This determination threshold value is set according to the amount of fuel in the fuel tank. Therefore, failure diagnosis can be executed according to the output characteristics of the fuel level sensor (refer to PTL 1).

CITATION LIST

Patent Literature

[PTL 1] Japanese Patent Laying-Open No. 2006-214390
[PTL 2] Japanese Patent Laying-Open No. 10-73468

SUMMARY OF INVENTION

Technical Problem

A hybrid vehicle incorporating a power storage device, an inverter, and a motor driven by the inverter as the power source for vehicle running, in addition to a conventional engine, must have the failure of the fuel level sensor detected.

As such hybrid vehicles, there is known a vehicle having an electric motor running mode in which the vehicle runs with the engine stopped (hereinafter, the electric motor running mode is referred to as "EV mode", whereas a running mode in which the engine is operated is referred to as "HV mode").

In order to determine that the fuel level sensor is in malfunction in the case where the fuel level detected by the fuel level sensor does not change exceeding a determination threshold value when the vehicle has run for a predetermined running distance, the hybrid vehicle must first consume fuel to run over a predetermined distance. Since the engine does not consume fuel when the aforementioned hybrid vehicle runs in an EV mode, the fuel level will not basically change. Therefore, a hybrid vehicle capable of running in an EV mode has the problem that a relatively long period of time is required before a determination can be made of a malfunction in the fuel level sensor.

Since the running distance in an EV mode can be increased at a hybrid vehicle capable of having the power storage device charged from a power source external to the vehicle (a system power supply), more time will be required before a malfunction in the fuel level sensor can be determined.

In view of the foregoing, an object of the present invention is to detect at an early stage a malfunction in a detector that detects an amount of fuel in a fuel tank at a hybrid vehicle.

Solution to Problem

According to the present invention, a hybrid vehicle includes an internal combustion engine, a rotating electric machine, a fuel tank, a detector, a malfunction determination unit, and a running mode control unit. The fuel tank stores fuel supplied to the internal combustion engine. The detector detects the amount of fuel in the fuel tank. The malfunction determination unit determines a malfunction in the detector based on a detection value by the detector. The running mode control unit controls switching between a first running mode for running with the internal combustion engine operated and a second running mode for running by the driving power of the rotating electric machine with the internal combustion engine stopped. The malfunction determination unit determines in the first running mode that the detector is in malfunction when a predetermined first condition is met, and determines in the second running mode that the detector is in malfunction when a predetermined second condition differing from the first condition is met. The first condition is met when a difference between a fuel consumption amount estimated to be consumed during running in the first running mode and an amount of change in the detection value during running in the first running mode exceeds a predetermined value. The second condition is met when a detection value by the detector changes exceeding a predetermined range during running in the second running mode.

Preferably, the malfunction determination unit determines whether or not the first condition is met when a first state amount indicating an amount of running in the first running mode reaches a first predetermined amount, and determines whether or not the second condition is met when a second state amount indicating an amount of running in the second running mode reaches a second predetermined amount. The second predetermined amount is smaller than the first predetermined amount.

Preferably, the first state amount is the running distance in the first running mode. The second state amount is the running distance in the second running mode.

Preferably, the first state amount is the running time in the first running mode. The second state amount is the running time in the second running mode.

Preferably, the hybrid vehicle further includes an injection amount calculation unit. The injection amount calculation unit calculates an injected amount of fuel at the internal combustion engine. The malfunction determination unit estimates the fuel consumption amount by accumulating the injected amount of fuel during running in the first running mode.

Preferably, the hybrid vehicle further includes a running distance calculation unit. The running distance calculation unit calculates the running distance by the hybrid vehicle. The malfunction determination unit estimates the fuel consumption amount based on fuel efficiency in the first running mode calculated beforehand, and a running distance in the first running mode calculated by the running distance calculation unit.

Preferably, the first condition is met when the detection value does not change even if the first state amount indicating the running amount in the first running mode reaches the first predetermined amount.

Preferably, the hybrid vehicle further includes a power storage device and a charging device. The power storage device stores electric power for running The charging device is configured to receive supply of electric power from a power supply external to the vehicle and charge the power storage device.

According to the present invention, a hybrid vehicle includes an internal combustion engine, a rotating electric machine, a fuel tank, and a detector. The fuel tank stores fuel supplied to the internal combustion engine. The detector detects an amount of fuel in the fuel tank. A control method of a hybrid vehicle includes the steps of determining a malfunction in the detector based on a detection value by the detector, and controlling switching between a first running mode for running with the internal combustion engine operated and a second running mode for running by the driving power of the rotating electric machine with the internal combustion engine stopped. The step of determining a malfunction includes the steps of determining in the first running mode that the detector is in malfunction when a predetermined first condition is met and determining in the second running mode that the detector is in malfunction when a predetermined second condition differing from the first condition is met. The first condition is met when a difference between a fuel consumption amount estimated to be consumed during running in the first running mode and an amount of change in the detection value during running in the first running mode exceeds a predetermined value. The second condition is met when the detection value by the detector changes exceeding a predetermined range during running in the second running mode.

Advantageous Effects of Invention

According to the present invention, a malfunction in the detector is determined based on a condition differing according to the running mode of the hybrid vehicle. When the hybrid vehicle is running in the second running mode, a determination is made that the detector is in malfunction when the detection value by the detector changes exceeding a predetermined range. Accordingly, in the second running mode, a malfunction in the detector can be detected regardless of the running distance of the hybrid vehicle. Therefore, the present invention allows a malfunction in the detector that detects the amount of fuel in the fuel tank to be detected at an early stage at the hybrid vehicle.

DESCRIPTION OF EMBODIMENTS

Figure 1:
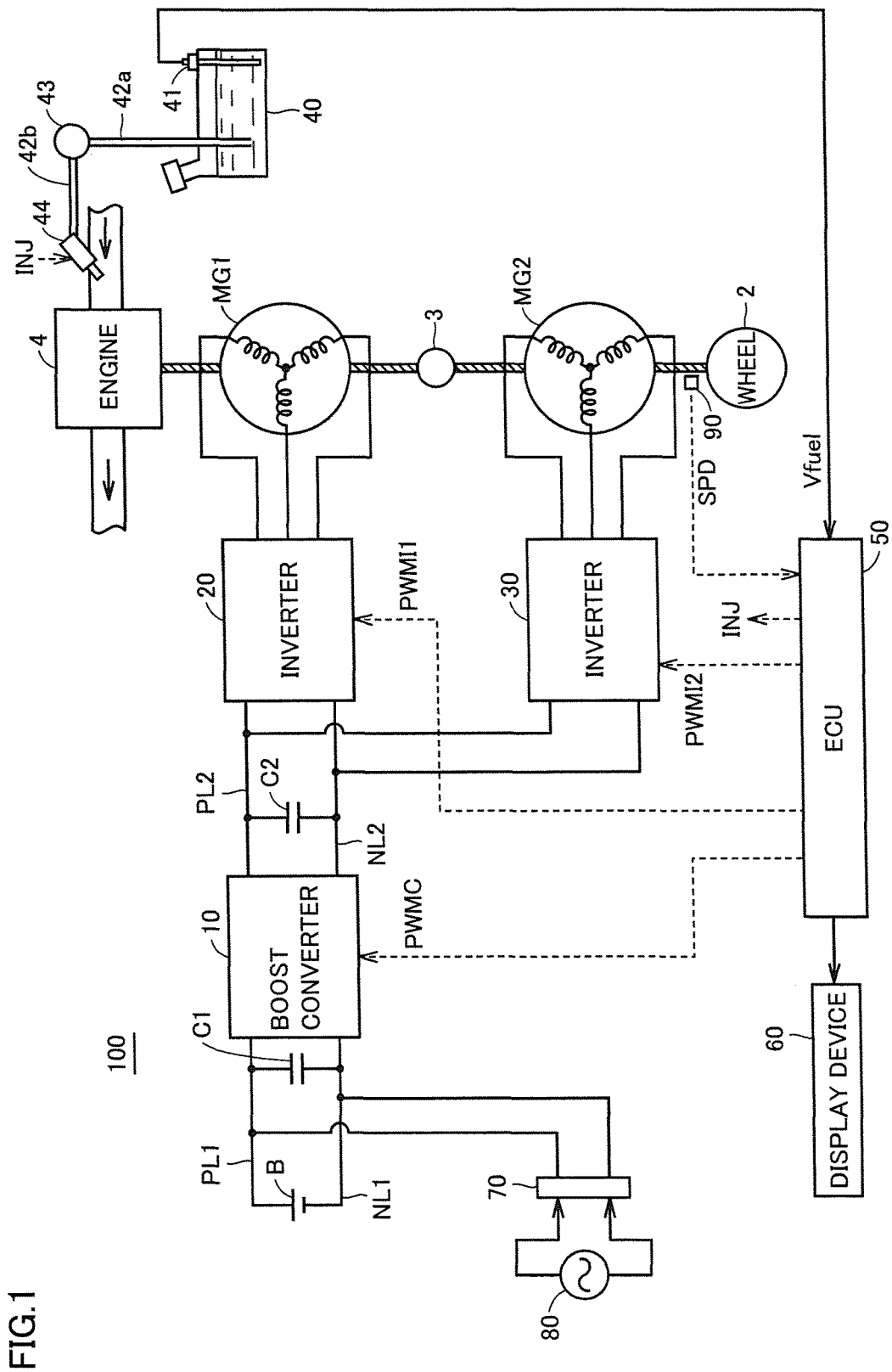
FIG. 1 represents a powertrain configuration of a hybrid vehicle according to a first embodiment of the present invention.

Embodiments of the present invention will be described in detail hereinafter with reference to the drawings. In the drawings, the same or corresponding elements have the same reference characters allotted, and description thereof will not be repeated.

First Embodiment

FIG. 1 represents a powertrain configuration of a hybrid vehicle according to a first embodiment of the present invention. Referring to FIG. 1, a hybrid vehicle 100 includes an engine 4, a fuel tank 40, a fuel sender gauge 41, fuel supply pipes 42a and 42b, a fuel pump 43, an injector 44, an electronic control unit (ECU) 50, and a display device 60.

Engine 4 is an internal combustion engine generating driving power by combustion of liquid fuel. The fuel includes gasoline, light oil, or alcohol, for example. Fuel tank 40 stores fuel that will be supplied to engine 4. Fuel tank 40 is connected to fuel pump 43 via fuel supply pipe 42a. Fuel pump 43 is connected to injector 44 via fuel supply pipe 42b.

Fuel pump 43 draws up fuel from fuel tank 40 for supply to injector 44. Injector 44 injects the fuel supplied from fuel tank 40 to an intake port of engine 4. The amount of fuel injected by injector 44 is controlled based on a control signal INJ from ECU 50. ECU 50 generates control signal INJ based on the output required of engine 4 and provides the generated control signal INJ to injector 44.

Fuel sender gauge 41 is provided at fuel tank 40. Fuel sender gauge 41 detects the amount of fuel in fuel tank 40. Fuel sender gauge 41 outputs to ECU 50 an output signal Vfuel indicating the detected amount of fuel. Output signal Vfuel is, for example, a voltage signal indicating a voltage in accordance with the detected amount of fuel. ECU 50 obtains the amount of fuel in fuel tank 40 based on output signal Vfuel received from fuel sender gauge 41. ECU 50 provides a signal indicating the amount of fuel in fuel tank 40 to display device 60.

Display device 60 presents a display to the user indicating the amount of fuel in fuel tank 40 based on the signal received from ECU 50. Display device 60 is, for example, an indicator located at the driver's seat of hybrid vehicle 100. The user can determine whether fueling is required or not by checking the amount of fuel in fuel tank 40 indicated at display device 60.

Hybrid vehicle 100 further includes motor generators MG1 and MG2, a power split device 3, a wheel 2, and a vehicle speed sensor 90.

Each of motor generators MG1 and MG2 is an AC rotating electric machine, such as a 3-phase AC synchronous rotating electric machine. Power split device 3 is coupled to engine 4 and motor generators MG1 and MG2 to split power therebetween. For power split device 3, a planetary gearset including the three rotational shafts of a sun gear, a planetary carrier, and a ring gear, for example, can be used. These three rotational shafts are connected to each rotational shaft of engine 4, motor generator MG1, and motor generator MG2, respectively.

The power generated by engine 4 is split to wheel 2 and motor generator MG1 by power split device 3. Specifically, engine 4 is incorporated into hybrid vehicle 100 as a driving source for driving wheel 2 and for driving motor generator MG1. Motor generator MG1 is incorporated into hybrid vehicle 100 to operate as a power generator driven by engine 4, and also as an electric motor that can start engine 4. Motor generator MG2 is incorporated into hybrid vehicle 100 as a driving source for driving wheel 2.

Vehicle speed sensor 90 detects the revolution speed of the driving shaft that drives wheel 2 as vehicle speed SPD. Vehicle speed sensor 90 outputs a signal indicting vehicle speed SPD to ECU 50.

Hybrid vehicle 100 further includes a power storage device B, a boost converter 10, inverters 20 and 30, positive lines PL1 and PL2, negative lines NL1 and NL2, capacitors C1 and C2, and a charging device 70.

Power storage device B has its positive terminal connected to positive line PL1 and its negative terminal connected to negative line NL1. Capacitor C1 is connected between positive line PL1 and negative line NL1. Boost converter 10 is connected between positive and negative lines PL1, NL1 and positive and negative lines PL2, NL2. Capacitor C2 is connected between positive line PL2 and negative line NL2. Inverter 20 is connected between positive and negative lines PL2, NL2 and motor generator MG1. Inverter 30 is connected between positive and negative lines PL2, NL2 and motor generator MG2.

Power storage device B is a chargeable DC power supply, formed of a secondary battery such as of nickel-metal hydride or lithium ions. Power storage device B supplies DC power to boost converter 10. Power storage device B is charged by receiving electric power output from boost converter 10 onto positive line PL1 and negative line NL1. For power storage device B, a capacitor of a large capacitance may be employed.

Boost converter 10 boosts the DC power output from power storage device B for output to positive line PL2 based on a signal PWMC from ECU 50. Moreover, boost converter 10 steps down the electric power supplied from inverters 20 and 30 to the voltage level of power storage device B based on signal PWMC to charge power storage device B. Boost converter 10 is formed of, for example, a step up/down chopper circuit.

Inverters 20 and 30 convert the DC power supplied from positive line PL2 and negative line NL2 into AC power for output to motor generators MG1 and MG2, respectively. Inverters 20 and 30 also convert the AC power generated by motor generators MG1 and MG2, respectively, into DC power for output onto positive line PL2 and negative line NL2 as the regenerative electric power. Inverters 20 and 30 drive a corresponding motor generator by a switching operation according to signals PWMI1 and PWMI2, respectively, from ECU 50.

Motor generator MG1 generates 3-phase AC power using the motive power of engine 4 and provides the generated 3-phase AC power to inverter 20. Motor generator MG1 generates driving power by the 3-phase AC power received from inverter 20 to start engine 4. Motor generator MG2 generates the vehicle driving torque by the 3-phase AC power received from inverter 30. Motor generator MG2 generates 3-phase AC power during regenerative braking of the vehicle for output to inverter 30.

Charging device 70 can charge power storage device B. By way of example, when charging device 70 is connected to an external power supply 80 (for example, system power supply) through a charging plug, charging device 70 converts the AC power supplied from external power supply 80 into DC power for output to power storage device B. Thus, charging of power storage device B is executed.

ECU 50 generates a signal PWMC directed to driving boost converter 10 and signals PWMI1 and PWMI2 directed to driving motor generators MG1 and MG2, respectively, and provides the generated signals PWMC, PWMI1 and PWMI2 to boost converter 10, inverter 20, and inverter 30, respectively.

ECU 50 controls the running mode of hybrid vehicle 100. In other words, ECU 50 controls the switching for running using motor generator MG2 alone with engine 4 stopped (EV mode) or for running with engine 4 operated (HV mode).

ECU 50 can control the switching between an EV mode and HV mode based on the charging state of power storage device B (hereinafter, also referred to as "SOC" (State of Charge)). Specifically, when the SOC of power storage device B becomes lower than a predetermined value Sth, ECU 50 causes engine 4 to be started and switches the running mode to the HV mode from the EV mode. Then, by performing power generation through motor generator MG1 using the motive power of engine 4 during running in an HV mode, the charging and discharging of power storage device B is regulated such that the SOC of power storage device B approaches value Sth.

Particularly after the charging operation by charging device 70, engine 4 is stopped such that hybrid vehicle 100 runs in an EV mode, unless sudden acceleration or slope climbing is executed, until the SOC of power storage device B becomes lower than predetermined value Sth. During running in an EV mode, the SOC of power storage device B is not particularly monitored, and will be reduced corresponding to the increase of the running distance. In an event of the SOC of power storage device B becoming lower than value Sth, engine 4 is started, and the running mode is switched from the EV mode to the HV mode. Since such a hybrid vehicle allowing power storage device B to be charged from external power supply 80 can start running in an EV mode from a fully charged state, the running distance in an EV mode can be lengthened as compared to a hybrid vehicle absent of an external charging function.

A failure at fuel sender gauge 41 will prevent the amount of fuel in fuel tank 40 to be identified properly. It is therefore necessary to detect a malfunction in fuel sender gauge 41.

In order to determine that there is a malfunction in the fuel level sensor when the fuel level detected by a fuel sender gauge does not change exceeding a determination threshold value in the case where a hybrid vehicle has been driven for a predetermined running distance, first the hybrid vehicle must run over a predetermined running distance by consuming fuel. It is to be noted that basically the fuel level does not change when the hybrid vehicle is running in an EV mode since the engine does not consume fuel during the EV mode. Therefore, the hybrid vehicle capable of running in an EV mode has the problem that a relatively long period of time will be required before a malfunction in the fuel sender gauge can be determined.

Particularly, the hybrid vehicle configured to allow a power storage device B to be charged from an external power supply has the running distance in an EV mode lengthened. Therefore, more time may be required before a malfunction in the fuel sender gauge can be determined. Moreover, since the hybrid vehicle has a lower frequency of fuel usage as compared to a vehicle that runs using only the motive force of the engine, there is a possibility that the aging fuel remaining in the fuel tank may be degraded to become the cause of failure.

According to the first embodiment of the present invention, a malfunction in fuel sender gauge 41 is detected, regardless of the running distance by hybrid vehicle 100 in an EV mode. Therefore, a malfunction in fuel sender gauge 41 can be detected at an early stage. The process of determining a malfunction in fuel sender gauge 41 will be described in detail hereinafter.

Figure 2:
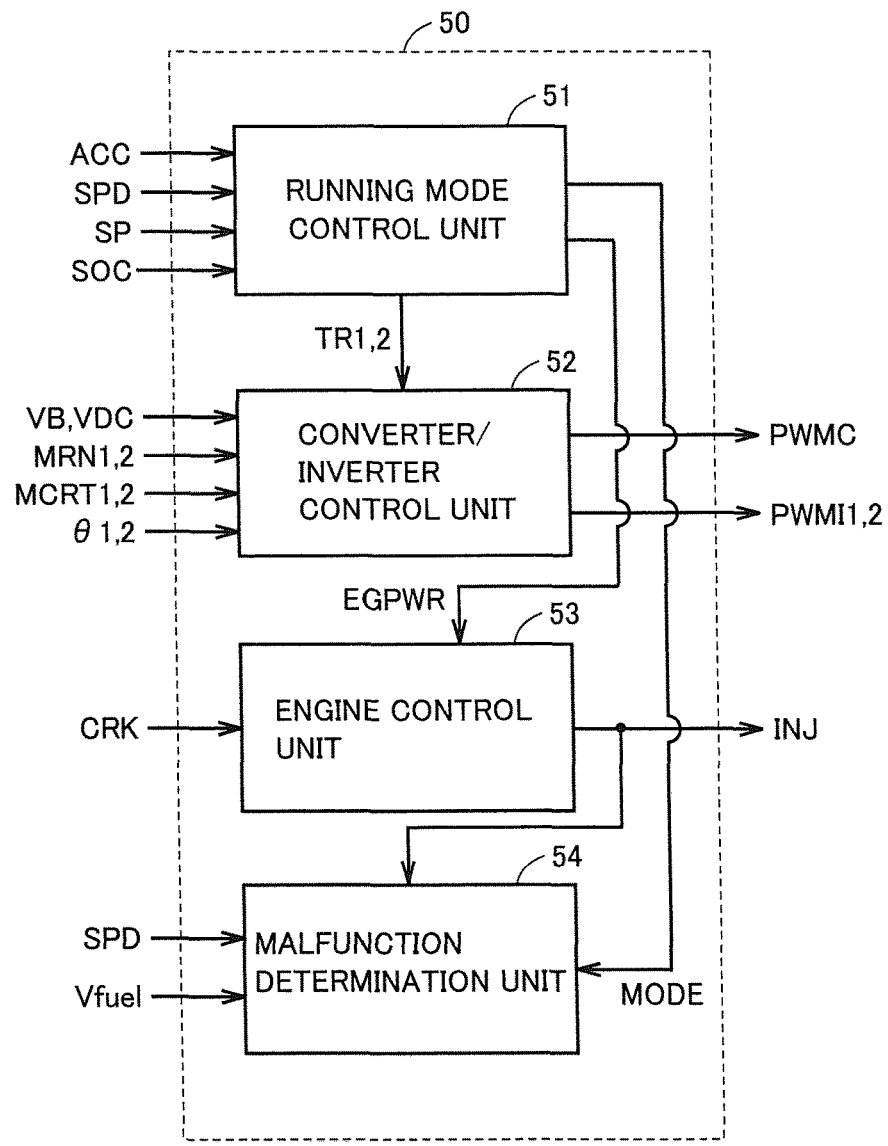
FIG. 2 is a functional block diagram of an ECU shown in FIG. 1.

FIG. 2 is a functional block diagram of ECU 50 shown in FIG. 1. Referring to FIG. 2, ECU 50 includes a running mode control unit 51, a converter/inverter control unit 52, an engine control unit 53, and a malfunction determination unit 54.

Running mode control unit 51 receives vehicle speed SPD from vehicle speed sensor 90, a detection value by each of an accelerator pedal position ACC and shift position SPD from a sensor not shown, and an estimation value of the SOC of power storage device B from a battery ECU not shown. Running mode control unit 51 determines, based on the aforementioned signals, whether to operate engine 4 or not during running, i.e. whether to run in an EV mode or HV mode, and generates torque command values TR1 and TR2 based on the determination result for output to converter/inverter control unit 52.

Running mode control unit 51 generates and provides to engine control unit 53 an engine output requirement value EGPWR based on the above-described determination result. Moreover, running mode control unit 51 provides to malfunction determination unit 54 a signal MODE indicating whether the running mode is in an EV mode or an HV mode.

Converter/inverter control unit 52 receives a voltage VB of power storage device B, a voltage VDC between positive line PL2 and negative line NL2, as well as each detection value of rotational speed MRN1 and MRN2 of motor generators MG1 and MG2 from a sensor not shown. Converter/inverter control unit 52 receives from running mode control unit 51 torque command values TR1 and TR2 of motor generators MG1 and MG2. Converter/inverter control unit 52 generates a PWM (Pulse Width Modulation) signal directed to driving boost converter 10 based on the aforementioned signals, and provides the generated PWM signal to boost converter 10 as signal PWMC.

Converter/inverter control unit 52 receives each detection value of motor current MCRT1 and motor rotational angle q1 of motor generator MG1 from sensors not shown. Converter/inverter control unit 52 generates a PWM signal directed to driving motor generator MG1 based on the signals of voltage VDC, motor current MRT1, motor rotational angle q1 and torque command value TR1, and provides the generated PWM signal to inverter 20 as signal PWMI1. Similarly, converter/inverter control unit 52 generates a PWM signal directed to driving motor generator MG2, and outputs the generated PWM signal to inverter 30 as signal PWMI2.

Engine control unit 53 receives from running mode control unit 51 an engine output requirement value EGPWR of engine 4. Engine control unit 53 receives a detection value of a crank angle CRK of engine 4 from a sensor not shown. Engine control unit 53 generates a signal directed to driving injector 44 based on crank angle CRK and engine output requirement value EGPWR, and outputs the generated signal to injector 44 as signal INJ.

Malfunction determination unit 54 receives vehicle speed SPD from vehicle speed sensor 90. Malfunction determination unit 14 receives output signal Vfuel from fuel sender gauge 41. Malfunction determination unit 54 receives signal INJ from engine control unit 53. Malfunction determination unit 54 receives signal MODE from running mode control unit 51. Malfunction determination unit 54 determines a malfunction in fuel sender gauge 41 based on these signals.

Figure 3:
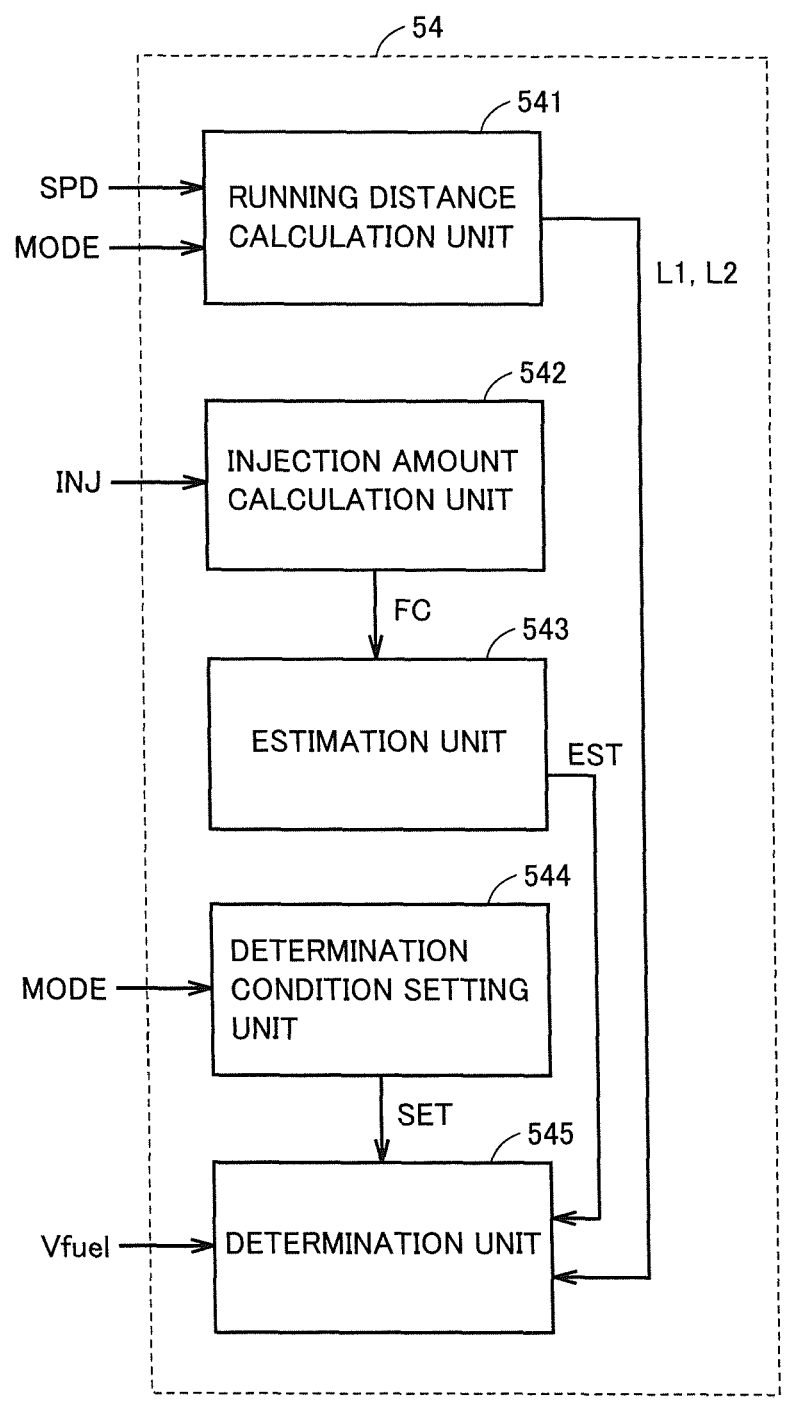
FIG. 3 is a functional block diagram of a malfunction determination unit shown in FIG. 2.

FIG. 3 is a functional block diagram of malfunction determination unit 54 shown in FIG. 2. Referring to FIG. 3, malfunction determination unit 54 includes a running distance calculation unit 541, an injection amount calculation unit 542, an estimation unit 543, a determination condition setting unit 544, and a determination unit 545.

Running distance calculation unit 541 receives vehicle speed SPD and signal MODE. Running distance calculation unit 541 calculates the running distance in each running mode based on these signals. Running distance calculation unit 541 outputs to determination unit 545 signals indicating a running distance L1 in an HV mode and a running distance L2 in an EV mode.

Injection amount calculation unit 542 receives signal INJ. Injection amount calculation unit 542 calculates the injected amount of fuel of injector 44 based on signal INJ. Specifically, injection amount calculation unit 542 can calculate the injected amount of fuel by converting the fuel injection time of injector 44 into a fuel amount by calculation. Injection amount calculation unit 542 outputs a signal FC indicating the injected amount of fuel to estimation unit 543.

Estimation unit 543 receives signal FC from injection amount calculation unit 542. Estimation unit 543 estimates the fuel consumption amount. Specifically, estimation unit 543 accumulates the injected amount of fuel to take the accumulated value as the fuel consumption amount. Estimation unit 543 outputs to determination unit 545 a signal EST indicating an estimation value of the fuel consumption amount.

Determination condition setting unit 544 receives signal MODE. Determination condition setting unit 544 sets, based on signal MODE, a determination condition directed to determining a malfunction in fuel sender gauge 41. Specifically, determination condition setting unit 544 sets a first condition as the determination condition when the running mode is an HV mode. Determination condition setting unit 544 sets a second condition as the determination condition when the running mode is an EV mode.

The first condition is met when the difference between the estimation value of the fuel consumption amount and the amount of change in the detection value by fuel sender gauge 41 is greater than a predetermined value Z. The second condition is met when the detection value by fuel sender gauge 41 changes exceeding a predetermined range X. Determination condition setting unit 544 outputs to determination unit 545 a signal SET indicating whether the determination condition is the first condition or the second condition. Predetermined range X is directed to determining a malfunction in fuel sender gauge 41 in an EV mode. The range is set taking into account a sensor malfunction at fuel sender gauge 41. Predetermined value Z is directed to determining a malfunction in fuel sender gauge 41 in an HV mode.

Determination unit 545 receives an output signal Vfuel, a signal SET from determination condition setting unit 544, and a running distance L1 in an HV mode and a running distance L2 in an EV mode from running distance calculation unit 541. Determination unit 545 determines that fuel sender gauge 41 is in malfunction when the determination condition is met based on these signals.

Figure 4:
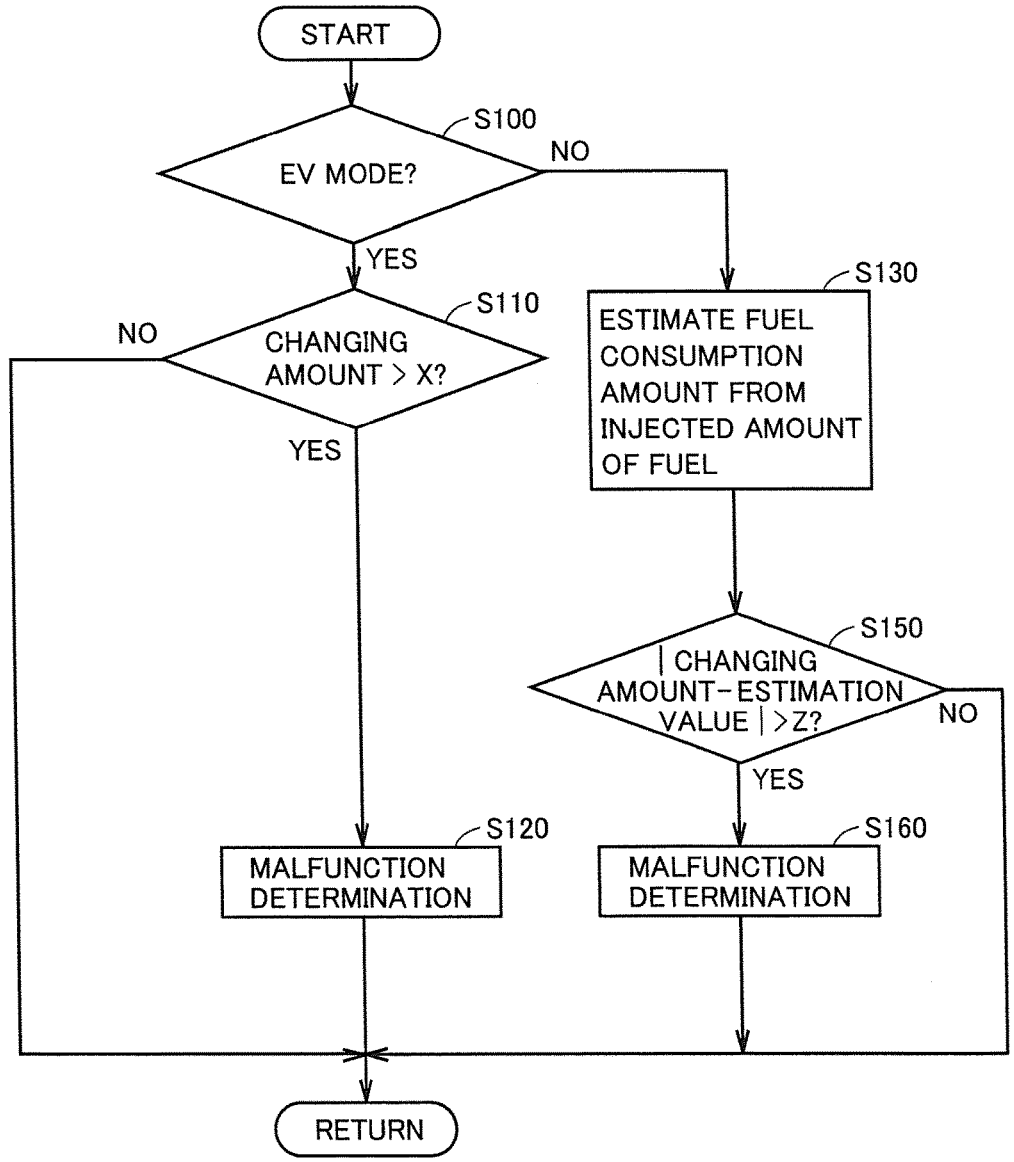
FIG. 4 is a flowchart related to a malfunction determination process by the ECU shown in FIG. 1.

FIG. 4 is a flowchart related to a malfunction determination process by ECU 50 shown in FIG. 1. Each of the steps in the flowchart of FIG. 4 is realized by invoking a program prestored in ECU 50 from the main routine, which is executed at a predetermined cycle or in response to a predetermined condition being met. Alternatively, dedicated hardware (electronic circuit) may be developed to realize the process (the same applies to the flowchart shown in FIG. 5 that will be described afterwards).

Referring to FIG. 4, ECU 50 determines whether the running mode is an EV mode or not at a step (hereinafter, step abbreviated as S) 100. When a determination is made that the running mode is an EV mode (YES at S100), ECU 50 then determines whether the amount of change in the detection value by fuel sender gauge 41 is greater than a predetermined range X (S110). When a determination is made that the amount of change in the detection value is less than or equal to predetermined range X (NO at S110), the following processing is skipped, and control returns to the main routine.

When a determination is made that the amount of change in the detection value is greater than predetermined range X (YES at S110), ECU 50 determines that fuel sender gauge 41 is in malfunction (S120).

In contrast, when a determination is made that the running mode is not an EV mode at S100 (NO at S100), the fuel consumption amount is estimated from the injected amount of fuel, assuming that the running mode is an HV mode (S130). Specifically, ECU 50 calculates the injected amount of fuel from signal INJ directed to driving injector 44, and accumulates the calculated injected amount of fuel to estimate the fuel consumption amount.

At S150, ECU 50 determines whether the difference between the amount of change in the detection value by fuel sender gauge 41 and the estimation value of the fuel consumption amount estimated at S130 is greater than a predetermined value Z. When a determination is made that the difference between the amount of change in the detection value and the estimation value of the fuel consumption amount is equal to or less than predetermined value Z (NO at S150), the following process is skipped, and control returns to the main routine.

When a determination is made that the difference between the amount of change in the detection value and the estimation value of the fuel consumption amount is greater than predetermined value Z (YES at S150), ECU 50 determines that fuel sender gauge 41 is in malfunction (S160).

Thus, a malfunction in fuel sender gauge 41 is determined based on a condition that differs according to the running mode of hybrid vehicle 100 in the first embodiment. In the case where hybrid vehicle 100 is running in an EV mode, fuel sender gauge 41 is determined to be in malfunction when the detection value by fuel sender gauge 41 changes exceeding a predetermined range X. Therefore, a malfunction in fuel sender gauge 41 can be detected regardless of the running distance of hybrid vehicle 100 in an EV mode. Thus, the first embodiment allows a malfunction to be detected at an early stage in fuel sender gauge 41 that detects the amount of fuel in fuel tank 40.

Second Embodiment

The previous first embodiment is based on the case where the fuel consumption amount is estimated based on the injected amount of fuel. The second embodiment is directed to the case of estimating the fuel consumption amount based on fuel efficiency of the hybrid vehicle.

The entire configuration of a hybrid vehicle 100A according to the second embodiment is similar to that of hybrid vehicle 100 shown in FIG. 1.

Figure 5:
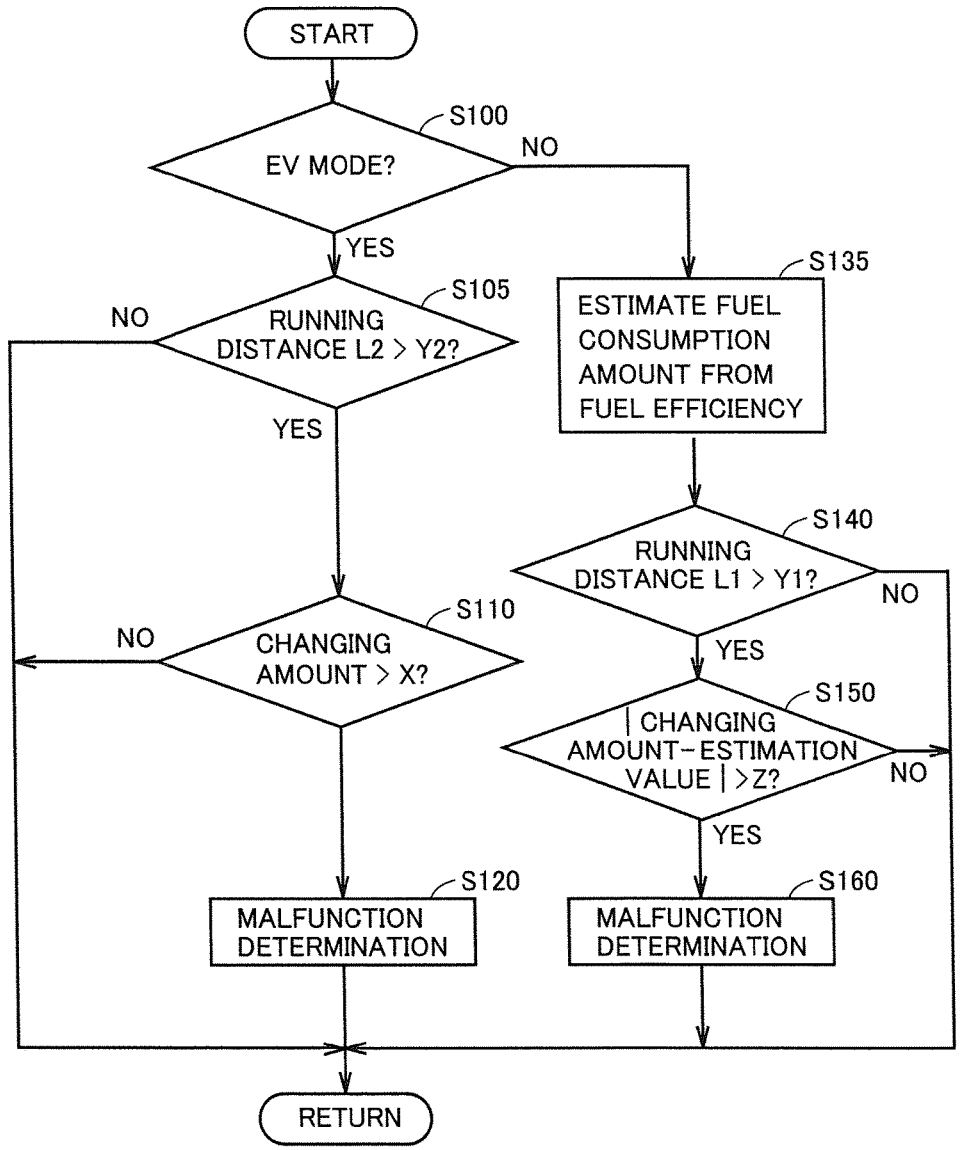
FIG. 5 is a flowchart related to a malfunction determination process by an ECU according to a second embodiment.

FIG. 5 is a flowchart related to a malfunction determination process by an ECU 50A according to the second embodiment. Referring to FIG. 5, the flowchart additionally includes S105, S135, and S140, alternative to S130 in the flowchart of FIG. 4. Specifically, when a determination is made that the running mode is an EV mode at S100 (YES at S100), ECU 50A then determines whether a running distance L2 in the EV mode is greater than a predetermined amount Y2 (S105).

When a determination is made that running distance L2 in the EV mode is equal to or less than a predetermined amount Y2 (NO at S105), the following process is skipped, and control returns to the main routine.

When a determination is made that running distance L2 in the EV mode is greater than a predetermined amount Y2 (YES at S105), ECU 50A determines whether the amount of change in the detection value by fuel sender gauge 41 is greater than predetermined range X (S110).

In contrast, when a determination is made that the running mode is not an EV mode at S100 (NO at S100), ECU 50A estimates the fuel consumption amount from the fuel efficiency, assuming that the running mode is an HV mode (S135). Specifically, ECU 50A estimates the fuel consumption amount at engine 4 based on the fuel efficiency in an HV mode calculated beforehand and a running distance L1 in an HV mode. The fuel efficiency in an HV mode is the average fuel efficiency during the HV mode.

At S140, ECU 50A determines whether running distance L1 in an HV mode is greater than a predetermined amount Y1. As used herein, predetermined amount Y2 is set at a value smaller than predetermined amount Y1. Predetermined amount Y1 is the running distance required to determine a malfunction in fuel sender gauge 41 in an HV mode. Predetermined amount Y2 is the running distance required to determine a malfunction in fuel sender gauge 41 in an EV mode.

Although the above description is based on the case where ECU 50A determines a malfunction in fuel sender gauge 41 when running distance L1 is greater than predetermined amount Y1 in an HV mode and when running distance L2 is greater than predetermined amount Y2 in an EV mode, ECU 50A may be configured to determine a malfunction in fuel sender gauge 41 when a running time T1 is greater than a predetermined amount Y1 in an HV mode and when a running time T2 is greater than a predetermined amount Y2 in an EV mode. Similarly in this case, predetermined amount Y2 is set smaller than predetermined amount Y1.

In the above description, ECU 50A may determine that fuel sender gauge 41 is in malfunction when the detection value by fuel sender gauge 41 does not change even if running distance L1 in an HV mode reaches predetermined amount Y1.

In the description set forth above, ECU 50A may detect that fuel sender gauge 41 is in malfunction regardless of the running distance of hybrid vehicle 100A in an EV mode, likewise with the first embodiment.

According to the second embodiment, the fuel consumption amount is estimated based on the fuel efficiency of hybrid vehicle 100A in an HV mode, and a malfunction in fuel sender gauge 41 can be determined based on the estimated fuel consumption amount.

In the second embodiment, a determination is made in an EV mode that fuel sender gauge 41 is in malfunction in a shorter running distance or shorter running time than in an HV mode. Therefore, a malfunction in fuel sender gauge 41 can be detected at an early stage.

Although the above embodiments have been described based on a series/parallel type hybrid vehicle that can transmit the power of engine 4 in a divided manner to the driving wheel and to motor generators MG1 and MG2 through power split device 3, the present invention is also applicable to a hybrid vehicle of another type. Namely, the present invention is also applicable to the so-called series type hybrid vehicle in which engine 4 is used only for driving motor generator MG1 and the driving power of the vehicle is generated by motor generator MG2 alone, or to a hybrid vehicle having only the regenerative energy collected as the electric energy from the kinetic energy generated by engine 4, or to a motor-assist type hybrid vehicle using the engine as the main driving power, assisted by a motor, as necessary, and the like.

Furthermore, although the above embodiments have been described based on a hybrid vehicle incorporating a charging device 70 that can be connected to an external power supply 80, the present invention is also applicable to a hybrid vehicle absent of charging device 70. Moreover, although the above embodiments have been described based on a hybrid vehicle having a boost converter 10 mounted, the present invention is also applicable to a hybrid vehicle absent of a boost converter 10.

The configuration of each of the embodiments set forth above in the present invention may be combined appropriately.

In the above description, engine 4 corresponds to an example of "internal combustion engine" in the present invention. Motor generator MG2 corresponds to an example of "rotating electric machine" in the present invention. Fuel sender gauge 41 corresponds to an example of "detector" in the present invention. The HV mode corresponds to an example of "first running mode" in the present invention. The EV mode corresponds to an example of "second running mode" in the present invention.

It should be understood that the embodiments disclosed herein are illustrative and non-restrictive in every respect. The scope of the present invention is defined by the terms of the claims, rather than the description of the embodiments set forth above, and is intended to include any modification within the scope and meaning equivalent to the terms of the claims.

REFERENCE SIGNS LIST

2 wheel; 3 power split device; 4 engine; 10 boost converter; 20, 30 inverter; 40 fuel tank; 41 fuel sender gauge; 42a, 42b fuel supply pipe; 43 fuel pump; 44 injector; 50, 50A, ECU, 60 display device; 70 charging device; 80 external power supply; 90 vehicle speed sensor; 100, 100A hybrid vehicle; B power storage device; C1, C2 capacitor; MG1, MG2 motor generator; NL1, NL2 negative line; PL1, PL2 positive line.

The invention claimed is:

1. A hybrid vehicle comprising:
an internal combustion engine;
a rotating electric machine;
a fuel tank storing fuel supplied to said internal combustion engine;
a detector for detecting an amount of fuel in said fuel tank;
a malfunction determination unit determining a malfunction in said detector based on a detection value by said detector; and
a running mode control unit controlling switching between a first running mode for running with said internal combustion engine operating and a second running mode for running by driving power of said rotating electric machine with said internal combustion engine stopped,
said malfunction determination unit determining in said first running mode that said detector is in malfunction when a predetermined first condition is met, and determining in said second running mode that said detector is in malfunction when a predetermined second condition differing from said first condition is met,
said first condition being met when a difference between a fuel consumption amount estimated to be consumed during running in said first running mode and an amount of change in said detection value during running in said first running mode exceeds a predetermined value, and
said second condition being met when said detection value by said detector exceeds a predetermined range during running in said second running mode,
wherein said malfunction determination unit determines whether or not said first condition is met when a first state amount indicating an amount of running in said first running mode reaches a first predetermined amount, and determines whether or not said second condition is met when a second state amount indicating an amount of running in said second running mode reaches a second predetermined amount, and said second predetermined amount is smaller than said first predetermined amount.

2. The hybrid vehicle according to claim 1, wherein
said first state amount is a running distance in said first running mode, and
said second state amount is a running distance in said second running mode.

3. The hybrid vehicle according to claim 1, wherein
said first state amount is a running time in said first running mode, and
said second state amount is a running time in said second running mode.

4. The hybrid vehicle according to claim 1, further comprising an injection amount calculation unit for calculating an injected amount of fuel at said internal combustion engine,
wherein said malfunction determination unit estimates said fuel consumption amount by accumulating the injected amount of fuel during running in said first running mode.

5. The hybrid vehicle according to claim 1, further comprising a running distance calculation unit for calculating a running distance by said hybrid vehicle,
wherein said malfunction determination unit estimates said fuel consumption amount based on fuel efficiency in said first running mode calculated beforehand, and a running distance in said first running mode calculated by said running distance calculation unit.

6. A hybrid vehicle comprising:
an internal combustion engine;
a rotating electric machine;
a fuel tank storing fuel supplied to said internal combustion engine;
a detector for detecting an amount of fuel in said fuel tank;
a malfunction determination unit determining a malfunction in said detector based on a detection value by said detector; and
a running mode control unit controlling switching between a first running mode for running with said internal combustion engine operating and a second running mode for running by driving power of said rotating electric machine with said internal combustion engine stopped,
said malfunction determination unit determining in said first running mode that said detector is in malfunction when a predetermined first condition is met, and determining in said second running mode that said detector is in malfunction when a predetermined second condition differing from said first condition is met, said first condition being met when a difference between a fuel consumption amount estimated to be consumed during running in said first running mode and an amount of change in said detection value during running in said first running mode exceeds a predetermined value, and said second condition being met when said detection value by said detector exceeds a predetermined range during running in said second running mode, wherein said first condition is met when said detection value does not change even if a first state amount indicating a running amount in said first running mode reaches a first predetermined amount.

7. The hybrid vehicle according to claim 1, further comprising:

a power storage device storing electric power for running; and a charging device configured to receive supply of electric power from a power supply external to said vehicle and charge said power storage device.

8. A control method of a hybrid vehicle, said hybrid vehicle including an internal combustion engine, a rotating electric machine, a fuel tank storing fuel supplied to said internal combustion engine, and a detector for detecting an amount of fuel in said fuel tank, said control method comprising the steps of:

determining a malfunction in said detector based on a detection value by said detector; and controlling switching between a first running mode for running with said internal combustion engine operating and a second running mode for running by driving power of said rotating electric machine with said internal combustion engine stopped, said step of determining a malfunction including the steps of:

determining in said first running mode that said detector is in malfunction when a predetermined first condition is met; and determining in said second running mode that said detector is in malfunction when a predetermined second condition differing from said first condition is met, said first condition being met when a difference between a fuel consumption amount estimated to be consumed during running in said first running mode and an amount of change in said detection value during running in said first running mode exceeds a predetermined value, said second condition being met when said detection value by said detector exceeds a predetermined range during running in said second running mode;

determining whether or not said first condition is met when a first state amount indicating an amount of running in said first running mode reaches a first predetermined amount; and determining whether or not said second condition is met when a second state amount indicating an amount of running in said second running mode reaches a second predetermined amount, wherein said second predetermined amount is smaller than said first predetermined amount.

\* \* \* \* \*